US009042570B2

(12) United States Patent
Sakamoto et al.

(10) Patent No.: US 9,042,570 B2
(45) Date of Patent: May 26, 2015

(54) ACTIVE VIBRATION NOISE CONTROL APPARATUS

(75) Inventors: Kosuke Sakamoto, Utsunomiya (JP); Toshio Inoue, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 222 days.

(21) Appl. No.: 13/991,114

(22) PCT Filed: Sep. 27, 2011

(86) PCT No.: PCT/JP2011/071983
§ 371 (c)(1), (2), (4) Date: May 31, 2013

(87) PCT Pub. No.: WO2012/086282
PCT Pub. Date: Jun. 28, 2012

(65) Prior Publication Data

US 2013/0259249 A1 Oct. 3, 2013

(30) Foreign Application Priority Data

Dec. 21, 2010 (JP) ................................ 2010-284297

(51) Int. Cl.
*G10K 11/16* (2006.01)
*G10K 11/175* (2006.01)
(Continued)

(52) U.S. Cl.
CPC ............ *G10K 11/175* (2013.01); *G10K 11/178* (2013.01); *G10K 2210/12821* (2013.01); *G10K 2210/3016* (2013.01)

(58) Field of Classification Search
CPC .............. G10K 1/175; G10K 11/1786; G10K 11/1788; G10K 2210/1282; G10K 2210/3046; G10K 2210/12821; G10K 2210/3016; H04R 2499/13; H04R 5/02; H04R 1/1083
USPC ............ 381/56, 71.1–71.8, 71.12, 94.1–94.9; 267/140.14; 188/299, 378–380; 180/312
See application file for complete search history.

(56) References Cited

U.S. PATENT DOCUMENTS 5,690,321 A * 11/1997 Seni et al. ................ 267/140.14
2004/0247137 A1 12/2004 Inoue et al.

FOREIGN PATENT DOCUMENTS

JP 05-158487 A 6/1993
JP 6-83369 A 3/1994
(Continued)

OTHER PUBLICATIONS

Office Action, Japanese Patent Application No. 2012-549668 dated May 7, 2014.
(Continued)

*Primary Examiner* — Vivian Chin
*Assistant Examiner* — Ammar Hamid
(74) *Attorney, Agent, or Firm* — Carrier Blackman & Associates, P.C.; Joseph P. Carrier; William D. Blackman

(57) ABSTRACT

An ANC apparatus using so-called adaptive control is provided with a cancellation sound output means which outputs front wheel cancellation sound that cancels front wheel vibration noise due to front wheel vibration at a position to be silenced on the basis of a front wheel reference signal, and outputs rear wheel cancellation sound that cancels rear wheel vibration noise due to predicted rear wheel vibration at the position to be silenced on the basis of a rear wheel reference signal, and a turning state detection means which detects a turning state of a vehicle. When a difference in travel trajectory between a front wheel and a rear wheel is detected on the basis of the turning state, the cancellation sound output means suppresses the output of the rear wheel cancellation sound.

4 Claims, 12 Drawing Sheets

(51) Int. Cl.
*G10K 11/178* (2006.01)
*H04B 1/00* (2006.01)

(56) References Cited

FOREIGN PATENT DOCUMENTS

| | | | | |
|---|---|---|---|---|
| JP | 06-110473 | A | | 4/1994 |
| JP | 2004-361721 | A | | 12/2004 |
| JP | 2007-216787 | A | | 8/2007 |
| JP | 2007216787 | A | * | 8/2007 |
| JP | 2008-184129 | A | | 8/2008 |
| JP | 2010-070023 | A | | 4/2010 |

OTHER PUBLICATIONS

International Search Report issued in PCT/JP2011/071983, mailed Jan. 10, 2012, 2 pages.

Extended European Search Report dated Aug. 19, 2014 issued in the corresponding EP Patent Application 11851791.1.

* cited by examiner

ACTIVE VIBRATION NOISE CONTROL APPARATUS

CROSS-REFERENCE TO RELATED APPLICATIONS

This application is a National Stage entry of International Application No. PCT/JP2011/071983, filed Sep. 27, 2011, which claims priority to Japanese Application No. 2010-284297, filed Dec. 21, 2010. The disclosures of the prior applications are hereby incorporated in their entirety by reference.

TECHNICAL FIELD

The present invention relates to an active vibration noise control apparatus for canceling a vibration noise based on a road input with a canceling sound, and more particularly to an active vibration noise control apparatus for canceling such a vibration noise according to a so-called adaptive control process.

BACKGROUND ART

Active noise control apparatus (hereinafter referred to as "ANC apparatus") are known as apparatus for controlling acoustics in relation to a vibration noise in vehicular passenger compartments. General ANC apparatus reduce a vibration noise by outputting a canceling sound that is in opposite phase with the vibration noise from a speaker in the vehicular passenger compartment. An error between the vibration noise and the canceling sound is detected as remaining noise by a microphone that is disposed in the vicinity of an ear of the driver of the vehicle, and is used to determine a subsequent canceling sound. Some ANC apparatus reduce a noise (muffled engine sound) that is generated in the passenger compartment as the engine operates (vibrates), and other ANC apparatus reduce a noise (road noise) that is generated in the passenger compartment as the road wheels are in rolling contact with the road while the vehicle is traveling {see, for example, U.S. Patent Application Publication No. 2004/0247137 (hereinafter referred to as "US 2004/0247137 A1"), Japanese Laid-Open Patent Publication No. 06-083369 (hereinafter referred to as "JP 06-083369 A"), and Japanese Laid-Open Patent Publication No. 2007-216787 (hereinafter referred to as "JP 2007-216787 A)}.

According to JP 06-083369 A, vibrations of the front road wheels are detected by a pickup (1) near the front road wheels. A canceling sound for canceling a vibration noise due to the vibrations of the front road wheels is generated based on an output signal (reference signal) from the pickup (1). The output signal (reference signal) from the pickup (1) is delayed by a delay circuit (4) depending on the vehicle speed. A canceling sound for canceling a vibration noise due to the vibrations of the rear road wheels is generated based on the delayed reference signal (see, for example, Abstract, FIG. 1, and paragraphs [0018] through [0026]).

According to JP 2007-216787 A, vibrations applied from the front road wheels to the vehicle body are detected by acceleration sensors (14, 16) near the front road wheels. Based on accelerations detected by the acceleration sensors and a vehicle speed detected by a vehicle speed sensor (26), a rear vibration estimator (20) estimates vibrations applied from the rear road wheels to the vehicle body. A canceling sound is output based on the vibrations estimated as being applied from the rear road wheels and a sound detected by a microphone (30) (see Abstract and FIG. 1).

SUMMARY OF INVENTION

According to JP 06-083369 A and JP 2007-216787 A, as described above, vibrations from the rear road wheels are estimated based on the vibrations from the front road wheels and the vehicle speed, and a canceling sound is output to contend with both the vibrations from the front road wheels and the vibrations from the rear road wheels.

Although the above estimating process is effective if the rear road wheels follow the same traveling path (hereinafter simply referred to as "path") as the front road wheels, it may not necessarily be effective if the path of the rear road wheels deviates from the path of the front road wheels. For example, as shown in FIG. 12, if a vehicle 2 makes a turn at an intersection, it is known that the path of the rear road wheels comes inwardly of the path of the front road wheels (the difference between inner road wheel paths and the difference between outer road wheel paths). Specifically, as shown in FIG. 12, a left front road wheel **4*a* follows a path indicated by a solid line 6, and a left rear road wheel 4*b* follows a path indicated by a broken line 8. It can be seen that the path of the left rear road wheel 4*b* comes inwardly of the path of the left front road wheel 4*a***. Not only when the vehicle makes a turn at an intersection, but also when the vehicle travels on a non-straight road (curved road or the like), the path of the rear road wheel deviates from the path of the front road wheel. In such a situation, according to the technology disclosed in JP 06-083369 A and JP 2007-216787 A, actual vibrations from the rear road wheel and predicted vibrations from the rear road wheel tend to differ from each other, with the results that the overall vibration noise may be increased by the presence of the canceling sound, and an abnormal sound may be produced.

The present invention has been made in view of the above drawbacks. It is an object of the present invention to provide an active vibration noise control apparatus which is capable of increasing a sound silencing capability.

According to the present invention, there is provided an active vibration noise control apparatus comprising a front road wheel vibration detecting unit for detecting a front road wheel vibration based on a road input to a front road wheel of a vehicle and outputting a front road wheel reference signal representing the detected front road wheel vibration, a vehicle speed detecting unit for detecting a vehicle speed of the vehicle, a delay time calculating unit for determining a delay time which represents a difference between times at which the front road wheel of the vehicle and a rear road wheel thereof pass through one spot, a rear road wheel reference signal output unit for outputting a rear road wheel reference signal representing a predicted rear road wheel vibration which is a delayed front road wheel vibration for the delay time, a canceling sound output unit for outputting, based on the front road wheel reference signal, a front road wheel canceling sound for canceling a front road wheel vibration noise due to the front road wheel vibration at a sound silencing target position, and for outputting, based on the rear road wheel reference signal, a rear road wheel canceling sound for canceling a rear road wheel vibration noise due to the predicted rear road wheel vibration at the sound silencing target position, and a steered state detecting unit for detecting a steered state of the vehicle, wherein the canceling sound output unit suppresses output of the rear road wheel canceling sound when the canceling sound output unit detects that a path followed by the front road wheel and a path followed by the rear road wheel are different from each other based on the steered state.

According to the present invention, the noise in the passenger compartment of the vehicle is prevented from being enhanced or an abnormal sound is prevented from being generated in the passenger compartment by the rear road wheel canceling sound which would otherwise be intensively produced due to the different paths followed by the front road wheel and the rear road wheel.

The canceling sound output unit may detect that the path followed by the front road wheel and the path followed by the rear road wheel are different from each other if a steering quantity representing the steered state is greater than a first threshold value. By comparing the steering quantity and the threshold value (first threshold value) with respect to the steering quantity with each other, it is possible to detect relatively easily that the paths followed by the front road wheel and the rear road wheel are different from each other.

The canceling sound output unit may detect that the path followed by the front road wheel and the path followed by the rear road wheel are different from each other if a steering rate representing the steered state is greater than a second threshold value. By comparing the steering rate and the threshold value (second threshold value) with respect to the steering rate with each other, it is possible to detect relatively easily that the paths followed by the front road wheel and the rear road wheel are different from each other.

The canceling sound output unit may suppress output of the rear road wheel canceling sound for a predetermined period after having detected that the path followed by the front road wheel and the path followed by the rear road wheel are different from each other based on the steered state. If it is detected that the path followed by the front road wheel and the path followed by the rear road wheel are different from each other based on the steered state, then it is considered that a certain time needs to elapse until the paths become aligned with each other. According to the above arrangement, a minimum time required for the path followed by the front road wheels and the path followed by the rear road wheels to be brought into alignment with each other may be set as a predetermined time to prevent the paths from being judged in error as being brought into alignment with each other regardless of the fact that the paths remain different from each other.

DESCRIPTION OF EMBODIMENTS

[A. Embodiment]

Figure 1:
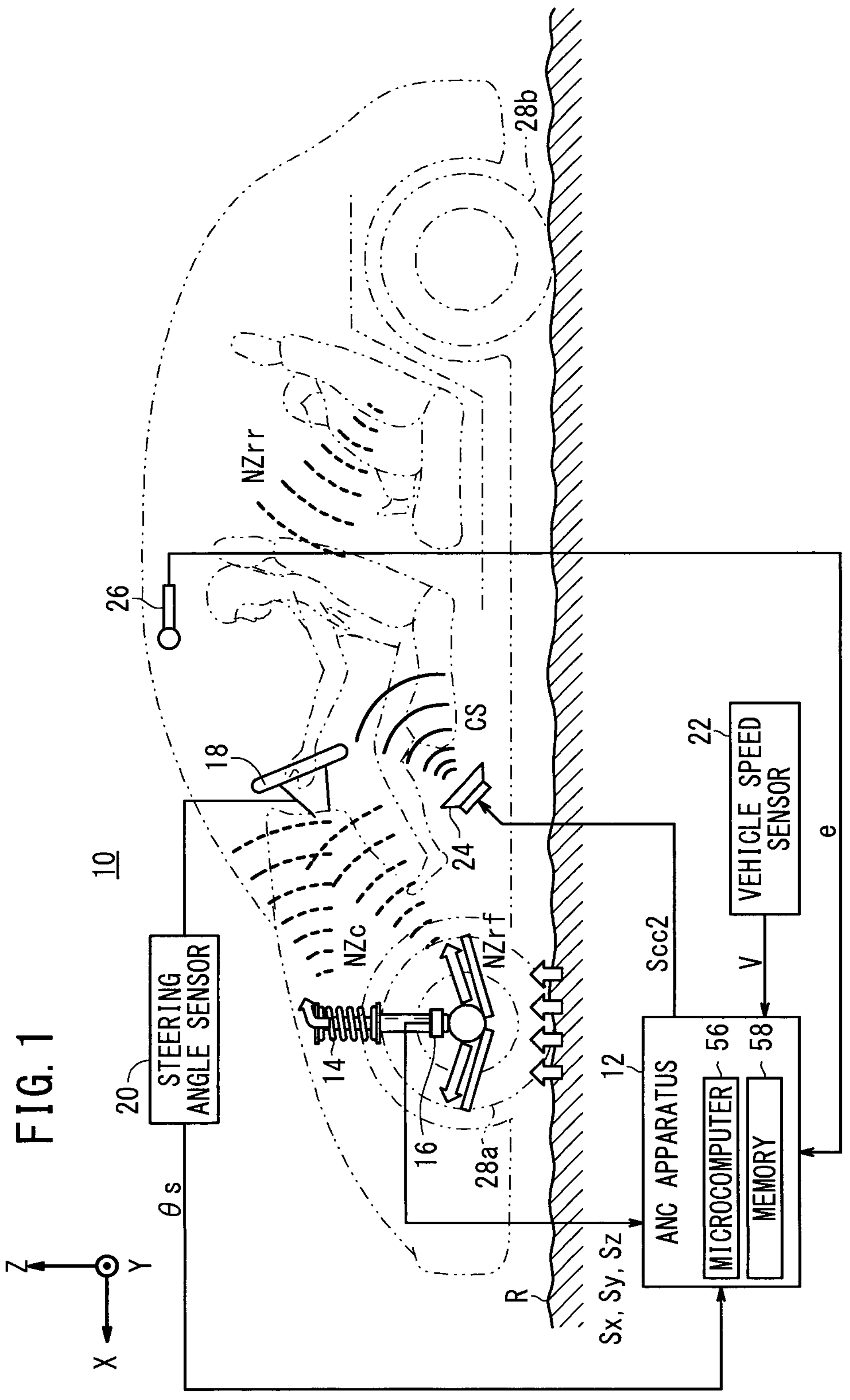
FIG. 1 is a schematic view of a vehicle which incorporates an active noise control apparatus according to an embodiment of the present invention.

1. Overall and Local Arrangements (1) Overall Arrangement:

FIG. 1 is a schematic view of a vehicle 10 which incorporates an active noise control apparatus 12 (hereinafter referred to as "ANC apparatus 12") according to an embodiment of the present invention. The vehicle 10 may be a vehicle such as a gasoline-powered vehicle, an electric vehicle (including a fuel cell vehicle), or the like.

The vehicle 10 includes, in addition to the ANC apparatus 12, a plurality of suspensions 14, a plurality of acceleration sensor units 16 combined respectively with the suspensions 14 that are coupled to front road wheels, a steering angle sensor 20 for detecting a steering angle θs [degrees] of a steering wheel 18, a vehicle speed sensor 22 for detecting a vehicle speed V [km/h] of the vehicle 10, a speaker 24, and a microphone 26. The steering angle θs represents the extent to which the steering wheel 18 is turned.

The ANC apparatus 12 generates a second combined control signal Scc2 based on acceleration signals Sx, Sy, Sz from the acceleration sensor units 16, the steering angle θs detected by the steering angle sensor 20, a vehicle speed V detected by the vehicle speed sensor 22, and an error signal e from the microphone 26. The second combined control signal Scc2 is amplified by an amplifier, not shown, and then output to the speaker 24. The speaker 24 outputs a canceling sound CS corresponding to the second combined control signal Scc2.

Figure 2:
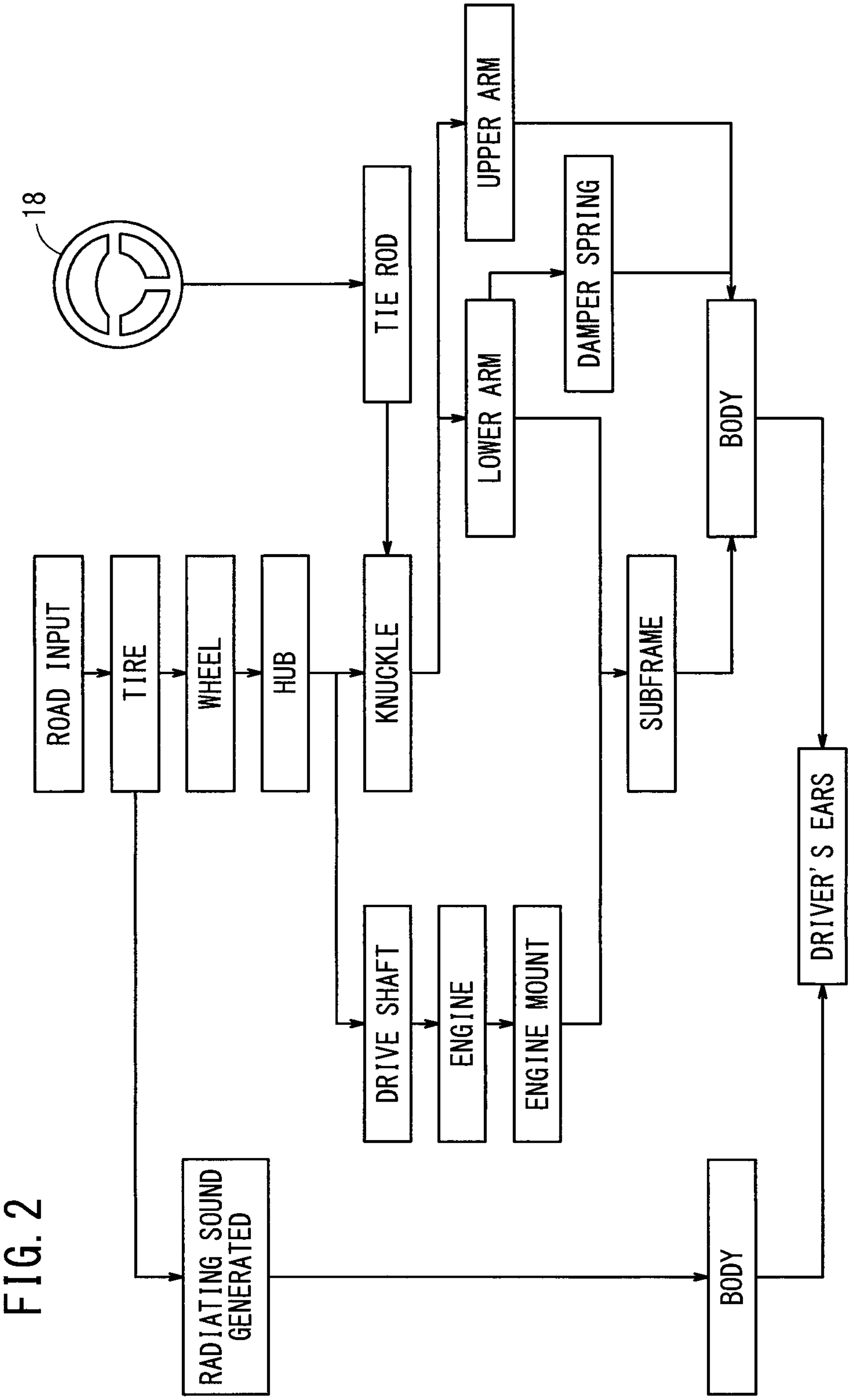
FIG. 2 is a diagram showing by way of example routes through which an input from the road to a road wheel is transmitted to the driver's ears in the embodiment.

A vibration noise that is produced in the passenger compartment of the vehicle 10 is a vibration noise (composite noise NZc) which is a combination of a vibration noise (muffled engine sound NZe) generated when the engine, not shown, vibrates, and a vibration noise (road noise NZr) generated when road wheels 28 vibrate, as the road wheels 28 (front road wheels **28*a*, rear road wheels 28*b*) are in rolling contact with a road R while the vehicle 10 is travelling. The ANC apparatus 12 according to the present embodiment cancels the road noise NZr of the composite noise NZc with the canceling sound CS, thereby providing a sound silencing capability. The road noise NZr includes a road noise (front road wheel road noise NZrf) due to vibrations input from left and right front road wheels 28*a*, and a road noise (rear road wheel road noise NZrr) due to vibrations input from left and right rear road wheels 28*b*. An input from the road to the road wheels 28 is transmitted to the positions of the driver's ears along routes shown in FIG. 2**.

The ANC apparatus 12 may have a sound silencing function to silence the muffled engine sound NZe, in addition to the sound silencing function to silence the road noise NZr. Specifically, the ANC apparatus 12 may include a conventional arrangement for silencing a muffled engine sound (see, for example, US 2004/0247137 A1).

Figure 4:
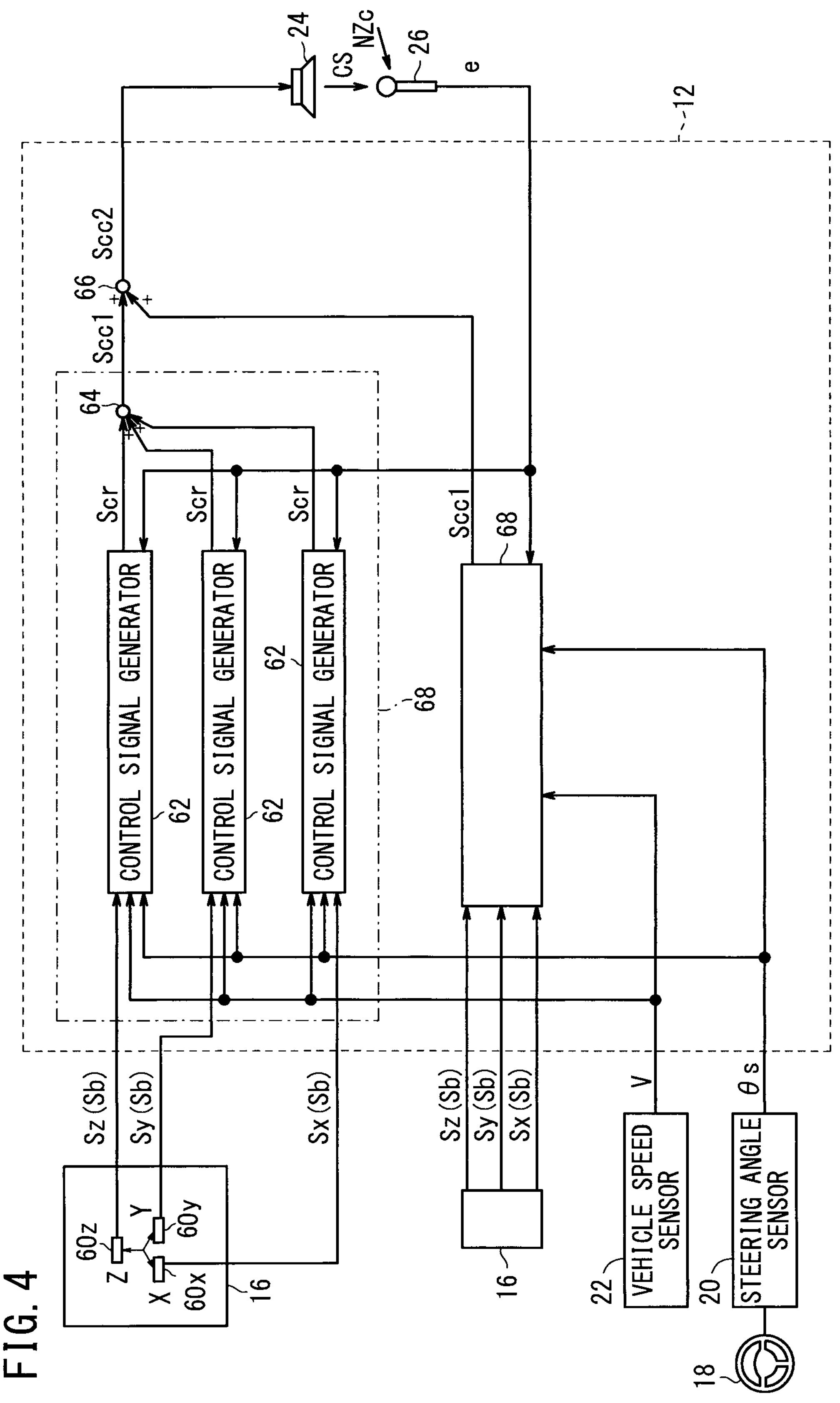
FIG. 4 is a functional block diagram of the active noise control apparatus.
Figure 5:
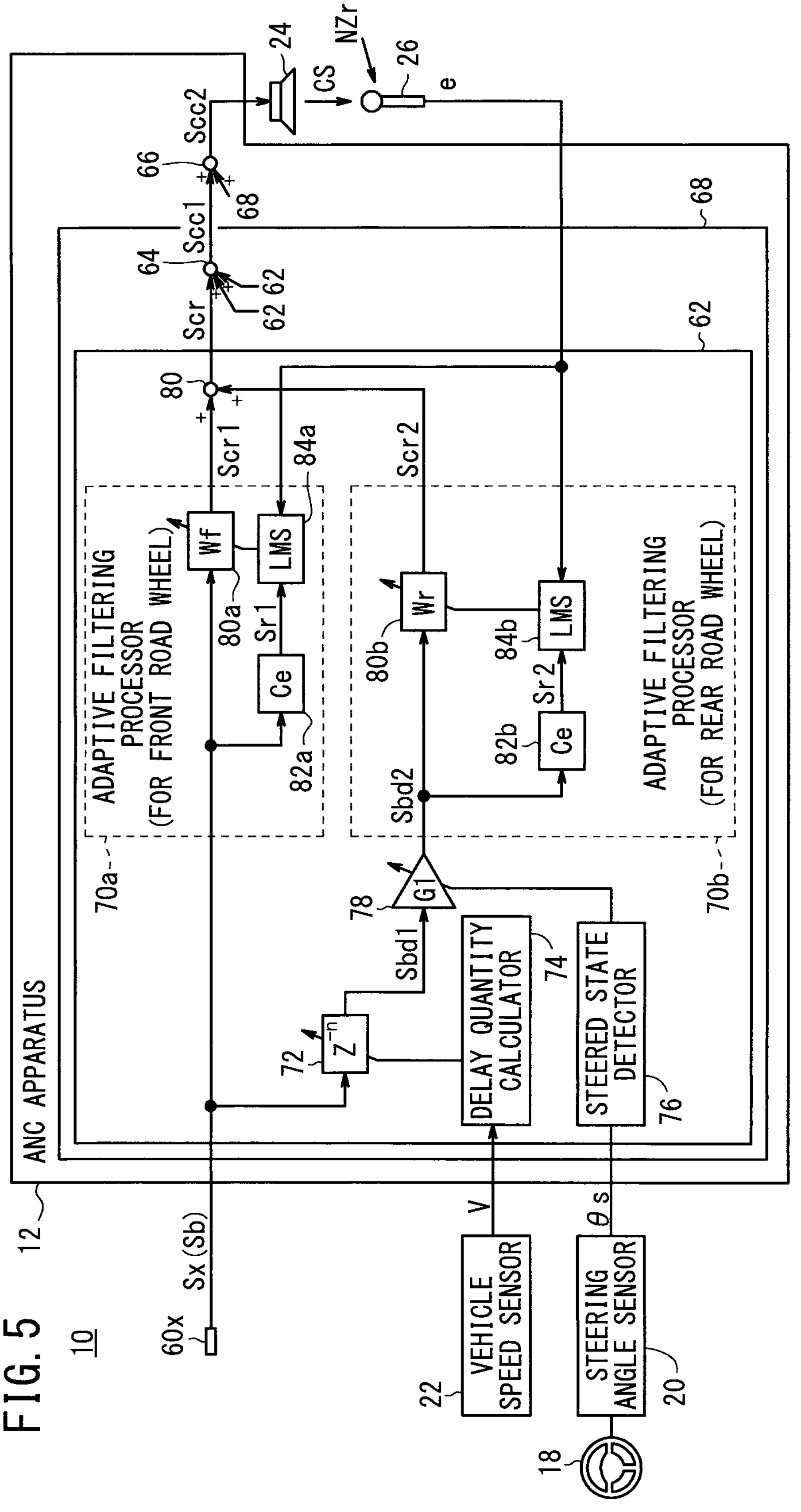
FIG. 5 is a functional block diagram of a control signal generator of the active noise control apparatus.

Although not shown in FIG. 1, the acceleration sensor units 16 are combined respectively with the left and right front road wheels **28*a* (see FIG. 4), i.e., in association with the two front road wheels 28*a* (left front road wheel and right front road wheel). In FIGS. 1, 4, and 5, the speaker 24 and the microphone 26 are illustrated as a single speaker and a single microphone for an easier understanding of the present invention. However, the ANC apparatus 12 may have a plurality of speakers 24 and a plurality of microphones 26 depending on how the ANC apparatus 12** is used, and other components may be changed in number accordingly.

Figure 3:
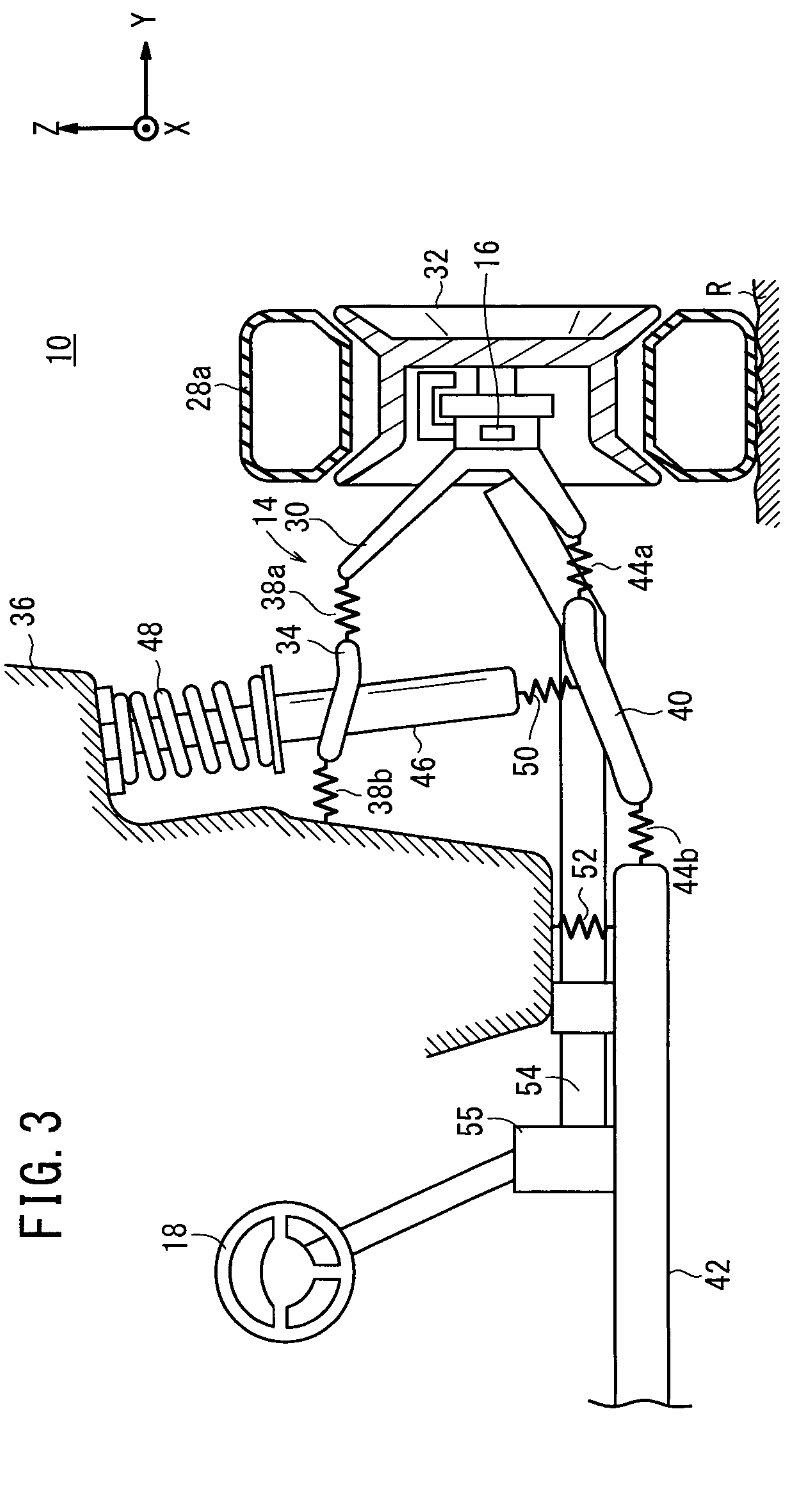
FIG. 3 is a schematic view of an accelerator sensor unit mounted on the vehicle and components in the periphery thereof.

(2) Suspensions 14 and Acceleration Sensor Units 16:

As shown in FIG. 3, each of the acceleration sensor units 16 is mounted on a knuckle 30 of the suspension 14 that is coupled to a wheel 32 of the front road wheel 28*a*. The suspension 14 includes, in addition to the knuckle 30, an upper arm 34 connected to the knuckle 30 and a vehicle body 36 by respective connectors 38*a*, 38*b*, a lower arm 40 connected to the knuckle 30 and a subframe 42 by respective connectors 44*a*, 44*b*, and a damper 46 connected to the vehicle body 36 by a damper spring 48 and connected to the lower arm 40 by a connector 50. The vehicle body 36 and the subframe 42 are connected to each other by a connector 52. A drive shaft 54 extending from the engine, not shown, and connected to the steering wheel 18 by a gearbox 55 is rotatably inserted in the knuckle 30.

As shown in FIG. 4, each of the acceleration sensor units 16 includes an acceleration sensor 60*x* for detecting a vibrational acceleration Ax, an acceleration sensor 60*y* for detecting a vibrational acceleration Ay, and an acceleration sensor 60*z* for detecting a vibrational acceleration Az. The vibrational acceleration Ax that is detected by the acceleration sensor 60*x* represents a vibrational acceleration [mm/s/s] of the knuckle 30 in a longitudinal direction (X-axis direction in FIG. 1) of the vehicle 10. The vibrational acceleration Ay that is detected by the acceleration sensor 60*y* represents a vibrational acceleration [mm/s/s] of the knuckle 30 in a transverse direction (Y-axis direction in FIG. 3) of the vehicle 10. The vibrational acceleration Az that is detected by the acceleration sensor 60*z* represents a vibrational acceleration [mm/s/s] of the knuckle 30 in a vertical direction (Z-axis direction in FIG. 1) of the vehicle 10.

Each of the acceleration sensor units 16 outputs acceleration signals Sx, Sy, Sz indicating the vibrational accelerations Ax, Ay, Az detected at the corresponding knuckle 30 to the ANC apparatus 12. The ANC apparatus 12 generates a canceling sound CS using the acceleration signals Sx, Sy, Sz as converted into digital signals by analog-to-digital (AD) conversion, as reference signals. The acceleration signals Sx, Sy, Sz will hereinafter be also referred to as reference signals Sb.

(3) ANC Apparatus 12:

(a) Overall Arrangement:

The ANC apparatus 12, which serves to control outputting of a canceling sound CS from the speaker 24, comprises a microcomputer 56, a memory 58 (FIG. 1), etc. The microcomputer 56 is capable of performing functions such as a function to determine a canceling sound CS (canceling sound determining function), etc. according to software processing.

FIG. 4 is a functional block diagram of the ANC apparatus 12. As shown in FIG. 4, the ANC apparatus 12 includes control signal generators 62 associated with the respective acceleration sensors 60*x*, 60*y*, 60*z*, first adders 64 associated with the respective acceleration sensor units 16 combined with the front road wheels 28*a*, and a second adder 66. The control signal generators 62, the first adders 64, and the second adder 66 are implemented by the microcomputer 56 and the memory 58.

In the present embodiment, the acceleration signals Sx, Sy, Sz that are output from the acceleration sensors 60*x*, 60*y*, 60*z* are analog signals, which are converted by analog-to-digital converters (not shown) of the ANC apparatus 12 into digital signals that are supplied to the control signal generators 62. The second adder 66 outputs a second combined control signal Scc2 as a digital signal, which is converted by a digital-to-analog converter (not shown) of the ANC apparatus 12 into an analog signal that is supplied to the speaker 24.

For illustrative purposes, the control signal generators 62 and the first adders 64 which are associated with each of the acceleration sensor units 16 is referred to as a control signal generator unit 68. In FIG. 4, the control signal generator unit 68 that is illustrated as an uppermost control signal generator unit has its internal details shown, whereas the other control signal generator unit 68 has its internal details omitted from illustration.

(b) Control Signal Generators 62:

FIG. 5 is a functional block diagram of one of the control signal generators 62. The illustrated control signal generator 62 corresponds to the acceleration sensor 60*x*. The other control signal generators 62 that correspond to the acceleration sensors 60*y*, 60*z* are of a similar arrangement to the illustrated control signal generator 62.

As shown in FIG. 5, the control signal generator 62 has adaptive filtering processors 70*a*, 70*b*, a delay setter 72, a delay quantity calculator 74, a steered state detector 76, a gain adjuster 78, and a third adder 80.

The adaptive filtering processor 70*a*, which corresponds to vibrations (measured value) input from the front road wheel 28*a*, performs an adaptive filter control process based on digital acceleration signals Sx, Sy, Sz (reference signals Sb) converted by the non-illustrated analog-to-digital converters. The adaptive filtering processor 70*a* includes an adaptive filter 80*a*, a reference signal corrector 82*a*, and a filter coefficient updater 84*a*.

The adaptive filter 80*a* comprises an FIR (Finite Impulse Response) filter or an adaptive notch filter. The adaptive filter 80*a* performs an adaptive filtering process using a filter coefficient Wf on the reference signal Sb, and outputs a front road wheel control signal Scr1 representing the waveform of a canceling sound CS (front road wheel canceling sound CSf) for reducing a front road wheel road noise NZrf which corresponds to road vibrations (measured value) input from the front road wheel 28*a*.

The reference signal corrector 82*a* generates a corrected reference signal Sr by performing a transfer function process on the reference signal Sb. The corrected reference signal Sr is used when the filter coefficient updater 84*a* calculates a filter coefficient Wf. The transfer function process is a process for correcting the reference signal Sb based on a transfer function Ce (filter coefficient) of a canceling sound CS from the speaker 24 to the microphone 26. The transfer function Ce used in the transfer function process is a measured or predicted value of an actual transfer function C of a canceling sound CS from the speaker 24 to the microphone 26.

The filter coefficient updater 84*a* successively calculates and updates a filter coefficient Wf. Specifically, the filter coefficient updater 84*a* calculates a filter coefficient Wf according to an adaptive algorithm {for example, a least mean square (LMS) algorithm}. Specifically, the filter coefficient updater 84*a* calculates a filter coefficient Wf for zeroing the square $e^2$ of an error signal e from the microphone 26 based on a corrected reference signal Sr1 from the reference signal corrector 82*a* and the error signal e. A specific process of calculating a filter coefficient Wf with the filter coefficient updater 84*a* is disclosed in US 2004/0247137 A1, for example.

The delay setter 72 outputs a first delay reference signal Sbd1 that is produced by delaying the reference signal Sb for a delay quantity n which is calculated by the delay quantity calculator 74.

The delay quantity calculator 74 calculates a delay quantity n to be used by the delay setter 72. Specifically, the delay quantity calculator 74 calculates a delay quantity n according to a following equation (1):

$$n=[Lwb/\{V\times 1000/(60\times 60)\}]/Pc \quad (1)$$

(to be rounded down to the nearest whole number)

where Lwb represents the wheelbase of the vehicle 10 (the distance between the axles of the front road wheels 28*a* and the axles of the rear road wheels 28*b*) [m], V the vehicle speed V [km/h] from the vehicle speed sensor 22, and Pc the calculating period [sec]. In the equation (1), the numeral "1000/(60×60)" represents a coefficient for converting the vehicle speed V from a unit of kilometers per hour to a unit of meters per second [m/sec], and may be dispensed with if the vehicle V is originally defined by way of a unit of meters per second. The result of the equation (1) may be rounded up to the nearest whole number or rounded off to the nearest whole number, rather than being rounded down to the nearest whole number.

As can be seen from the equation (1), the delay quantity n according to the present embodiment indicates how much the reference signal Sb to be used for the rear road wheels 28*b* (first delay reference signal Sbd1) is to be delayed from a processing cycle Pc for the reference signal Sb to be used for the front road wheels 28*a*, providing the same reference signals Sb are used. In the present embodiment, only the vehicle speed V is variable in the equation (1). Therefore, rather than carrying out the calculation represented by the equation (1), a map representing the relationship between the vehicle speed V and the delay quantity n may be stored in the memory 58 in advance, and a delay quantity n may be established depending on the present vehicle speed V based on the map.

The steered state detector 76 sets a gain G1 to be used by the gain adjuster 78 based on the steering angle θs from the steering angle sensor 20 (to be described in detail later).

The gain adjuster 78 amplifies the first delay reference signal Sbd1 depending on the gain G1 set by the steered state detector 76, and outputs the amplified first delay reference signal Sbd1 as a second delay reference signal Sbd2.

The adaptive filtering processor 70*b*, which corresponds to vibrations (estimated value) input from the rear road wheel 28*b*, is of the same configuration as the adaptive filtering processor 70*a*. However, the adaptive filtering processor 70*b* uses the second delay reference signal Sbd2 instead of the reference signal Sb. Consequently, a rear road wheel control signal Scr2 that is output from an adaptive filter 80*b* of the adaptive filtering processor 70*b* represents the waveform of a rear road wheel canceling sound CSr for reducing a rear road wheel road noise NZrr which corresponds to road vibrations (estimated value) input from the rear road wheel 28*b*.

The third adder 80 combines the front road wheel control signal Scr1 from the adaptive filtering processor 70*a* and the rear road wheel control signal Scr2 from the adaptive filtering processor 70*b* with each other, thereby generating a control signal Scr.

(c) First Adders 64:

Each of the first adders 64 combines the control signals Scr from the respective control signal generators 62 with each other, thereby generating a first combined control signal Scc1.

(d) Second Adder 66:

The second adder 66 combines the first combined control signals Scc1 output from the first adders 64 of the respective control signal generator units 68 with each other, thereby generating a second combined control signal Scc2. The second combined control signal Scc2 is converted by the non-illustrated D/A converter into an analog signal, which is supplied to the speaker 24.

(4) Speaker 24:

The speaker 24 outputs a canceling sound CS corresponding to the second combined control signal Scc2 from the ANC apparatus 12 (microcomputer 56), thus providing a sound silencing capability for silencing the road noise NZr (sum of front road wheel road noise NZrf and rear road wheel road noise NZrr).

(5) Microphone 26:

The microphone 26 detects an error between the road noise NZr and the canceling sound CS as a remaining noise, and outputs an error signal e representing the remaining noise to the ANC apparatus 12 (microcomputer 56).

Figure 6:
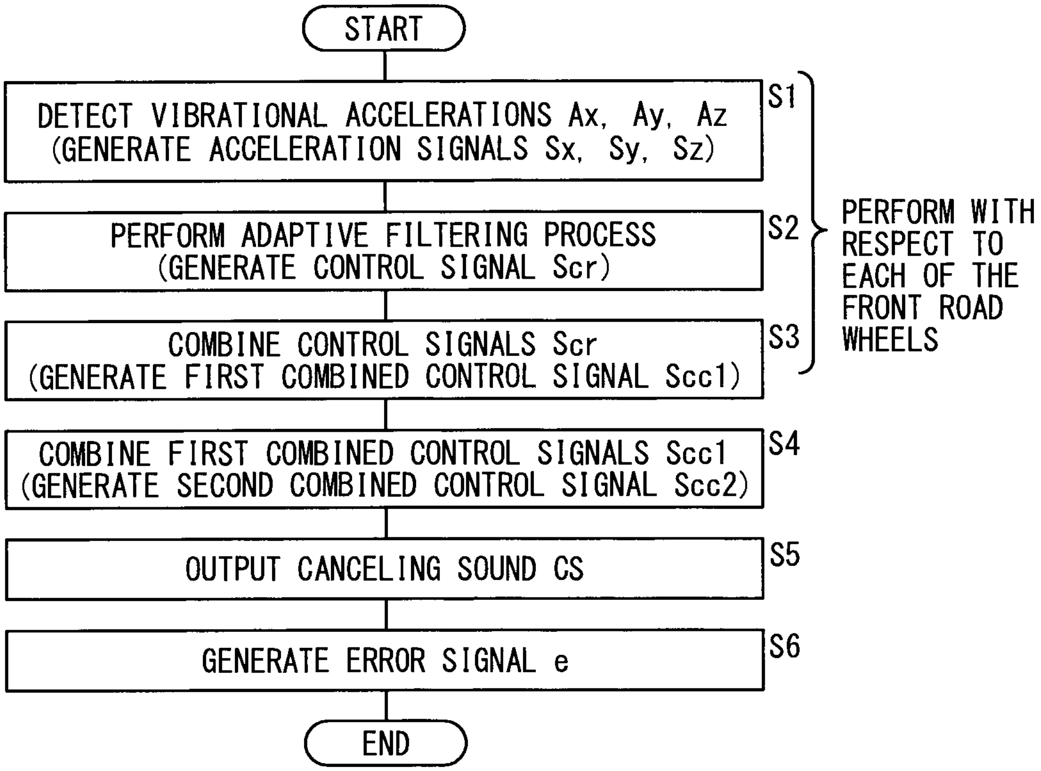
FIG. 6 is a flowchart of a process of generating a canceling sound according to the embodiment.

2. Processing Details of Various Components:

(1) Generation of Canceling Sound CS:

A sequence of generation of a canceling sound CS according to the present embodiment will be described below. FIG. 6 is a flowchart of a process of generating a canceling sound CS.

In step S1, the acceleration sensors 60*x*, 60*y*, 60*z* of each of the acceleration sensor units 16 detect a vibrational acceleration Ax in the X-axis direction, a vibrational acceleration Ay in the Y-axis direction, and a vibrational acceleration Az in the Z-axis direction, respectively, and generate respective acceleration signals Sx, Sy, Sz (reference signals Sb) representing the vibrational accelerations Ax, Ay, Az.

In step S2, the control signal generators 62 perform an adaptive filtering process to generate control signals Scr based on the acceleration signals Sx, Sy, Sz (reference signals Sb) as converted into digital signals by the non-illustrated A/D converters, and the error signal e from the microphone 26. As described above, each of the control signals Scr represents the sum of the front road wheel control signal Scr1 and the rear road wheel control signal Scr2.

In step S3, each of the first adders 64 combines the control signals Scr output from the control signal generators 62 with each other, thereby generating a first combined control signal Scc1.

The ANC apparatus 12 performs above steps S1 through S3 with respect to each of the acceleration sensor units 16 combined with the front road wheels 28*a*.

In step S4, the second adder 66 combines the first combined control signals Scc1 output from the respective first adders 64 with each other, thereby generating a second combined control signal Scc2.

In step S5, the speaker 24 outputs a canceling sound CS based on the second combined control signal Scc2. When the second combined control signal Scc2 is input from the second adder 66 to the speaker 24, the second combined control signal Scc2 is converted into an analog signal by the non-illustrated D/A converter and adjusted in amplitude by the non-illustrated amplifier.

In step S6, the microphone 26 detects the difference between the composite noise NZc including the road noise NZr and the canceling sound CS as a remaining noise, and outputs an error signal e corresponding to the remaining noise. The error signal e will be used in a subsequent adaptive filtering process performed by the ANC apparatus 12.

The ANC apparatus 12 repeats steps S1 through S6 described above in each of successive processing cycles Pc.

Figure 7:
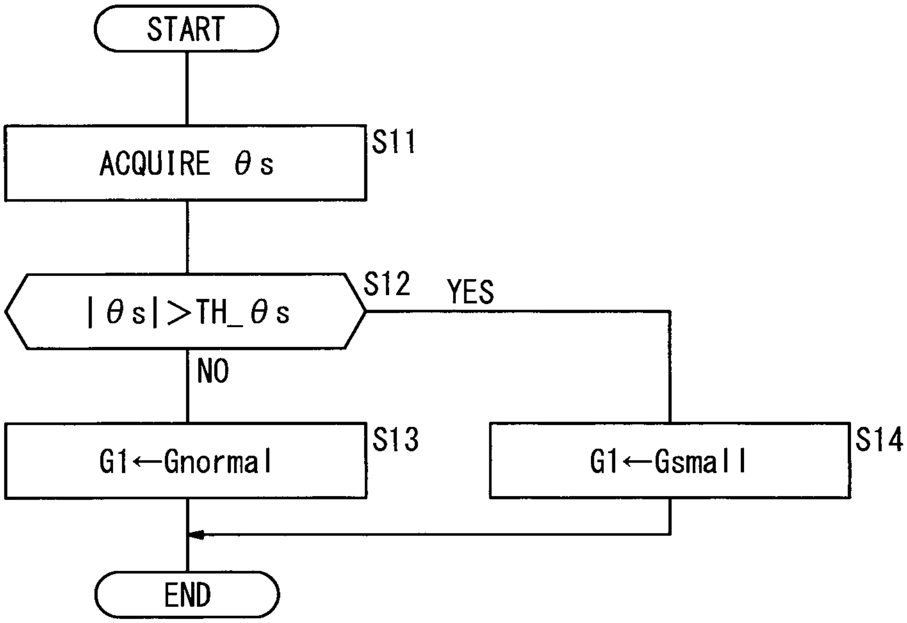
FIG. 7 is a flowchart of a processing sequence of a steered state detector according to the embodiment.

(2) Processing Sequence of Steered State Detector 76:

A processing sequence of the steered state detector 76 will be described below. FIG. 7 is a flowchart of a processing sequence of the steered state detector 76.

In step S11, the steered state detector 76 acquires a steering angle θs from the steering angle sensor 20. In step S12, the steered state detector 76 judges whether the absolute value of the steering angle θs is greater than a steering angle threshold value TH_θs (hereinafter referred to as "threshold value TH_θs") or not. The threshold value TH_θs is a positive value by which to judge whether the path followed by the front road wheels 28*a* of the vehicle 10 and the path followed by the rear road wheels 28*b* thereof are different from each other or not.

If the absolute value of the steering angle θs is not greater than the threshold value TH_θs (S12: NO), then the steered state detector 76 sets a gain value Gnormal, which is used normally, as the gain G1 in step S13.

If the absolute value of the steering angle θs is greater than the threshold value TH_θs (S12: YES), then the steered state detector 76 sets a gain value Gsmall, which is smaller than the gain value Gnormal, as the gain G1 in step S14. When the gain value Gsmall, which is smaller than the gain value Gnormal, is used as the gain G1, the value of the second delay reference signal Sbd2 is reduced. As a result, the rear road wheel control signal Scr2 output from the adaptive filter 80*b* is reduced. Therefore, the rear road wheel canceling sound CSr based on the rear road wheel control signal Scr2 is also reduced.

3. Advantages of the Present Embodiment:

According to the present embodiment, as described above, when the paths followed by the front road wheels 28*a* and the rear road wheels 28*b* are detected as different from each other based on the steering angle θs (steered state), the speaker 24 reduces the output of the rear road wheel canceling sound CSr. Consequently, the noise in the passenger compartment is prevented from being enhanced or an abnormal sound is prevented from being generated by the rear road wheel canceling sound CSr which would otherwise be intensively produced due to the different paths followed by the front road wheels 28*a* and the rear road wheels 28*b*.

According to the present embodiment, the steered state detector 76 detects that the paths followed by the front road wheels 28*a* and the rear road wheels 28*b* are different from each other when the steering angle θs is greater than the threshold value TH_θs. By comparing the steering angle θs and the threshold value TH_θs (first threshold value) with each other, it is possible to detect relatively easily that the paths followed by the front road wheels 28*a* and the rear road wheels 28*b* are different from each other.

[B. Applications of the Invention]

The present invention is not limited to the above embodiment, but may adopt various arrangements based on the disclosure of the present description. For example, the present invention may adopt the following arrangements:

1. Acceleration Sensor Units 16:

In the above embodiment, the two front road wheels 28*a* are associated with the respective acceleration sensor units 16. However, only one front road wheel 28*a* may be associated with an acceleration sensor unit 16. In the above embodiment, each of the acceleration sensor units 16 detects vibrational accelerations Ax, Ay, Az along the directions of the three axes, i.e., the X-axis direction, the Y-axis direction, and the Z-axis direction. However, each of the acceleration sensor units 16 may detect vibrational accelerations along the directions of one or two axes or four or more axes.

In the above embodiment, vibrational accelerations Ax, Ay, Az are directly detected by the acceleration sensors 60*x*, 60*y*, 60*z*. However, displacement sensors may detect displacements [mm] of the knuckle 30, and vibrational accelerations Ax, Ay, Az may be calculated based on the detected displacements. Similarly, vibrational accelerations Ax, Ay, Az may be determined using detected values from load sensors. Furthermore, vibration noises may be detected by microphones disposed in the vicinity of the front road wheels 28*a*, and signals representing the detected vibration noises may be used instead of acceleration signals Sx, Sy, Sz.

In the above embodiment, the acceleration sensor units 16 are mounted on the respective knuckles 30. However, the acceleration sensor units 16 may be mounted on other parts such as hubs or the like.

2. Process of Suppressing Rear Road Wheel Canceling Sound CSr:

In the above embodiment, the rear road wheel canceling sound CSr is suppressed by lowering the value of the gain G1 for the first delay reference signal Sbd1. However, the rear road wheel canceling sound CSr may be suppressed in another way.

Figure 8:
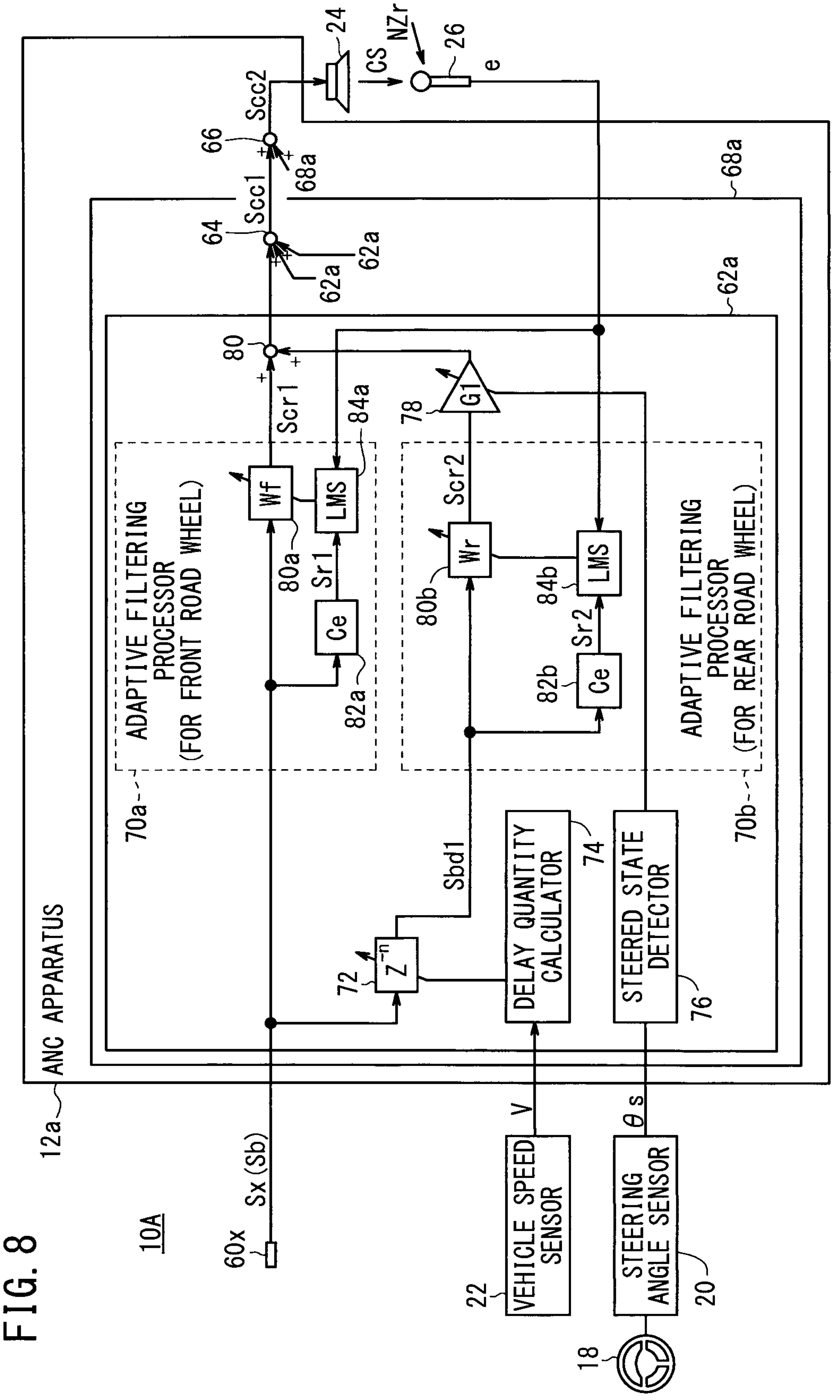
FIG. 8 is a functional block diagram of a first modification of the control signal generator.

FIG. 8 is a functional block diagram of a control signal generator 62*a* of an active noise control apparatus 12*a* (hereinafter referred to as "ANC apparatus 12*a*") incorporated in a vehicle 10A according to a first modification of the vehicle 10. The control signal generator 62*a* shown in FIG. 8 corresponds to the acceleration sensor 60*x*. The other control signal generators 62*a* that correspond to the acceleration sensors 60*y*, 60*z* are of a similar arrangement to the illustrated control signal generator 62*a*. For illustrative purposes, the control signal generators 62*a* and the first adders 64 which are associated with each of the acceleration sensor units 16 is referred to as a control signal generator unit 68*a*.

The ANC apparatus 12 shown in FIG. 5 has the gain adjuster 78 disposed between the delay setter 72 and the adaptive filtering processor 70*b*. However, the ANC apparatus 12*a* shown in FIG. 8 has the gain adjuster 78 disposed between the adaptive filtering processor 70*b* and the third adder 80. The arrangement shown in FIG. 8 makes it possible to suppress the rear road wheel canceling sound CSr by multiplying the rear road wheel control signal Scr2 output from the adaptive filtering processor 70*b* by the gain G1.

Figure 9:
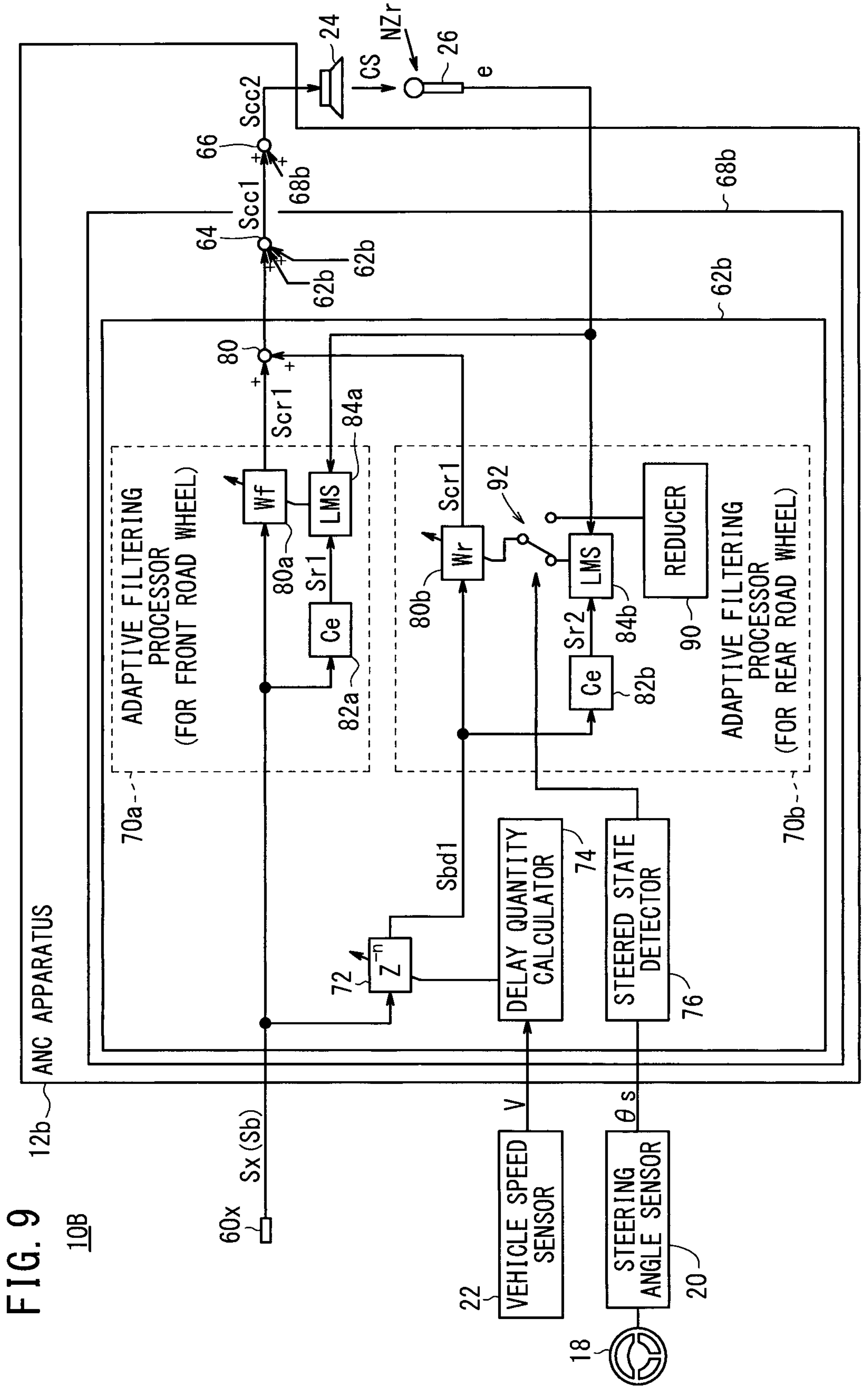
FIG. 9 is a functional block diagram of a second modification of the control signal generator.

FIG. 9 is a functional block diagram of a control signal generator 62*b* of an active noise control apparatus 12*b* (hereinafter referred to as "ANC apparatus 12*b*") incorporated in a vehicle 10B according to a second modification of the vehicle 10. The control signal generator 62*b* shown in FIG. 9 corresponds to the acceleration sensor 60*x*. The other control signal generators 62*b* that correspond to the acceleration sensors 60*y*, 60*z* are of a similar arrangement to the illustrated control signal generator 62*b*. For illustrative purposes, the control signal generators 62*b* and the first adders 64 which are associated with each of the acceleration sensor units 16 is referred to as a control signal generator unit 68*b*.

The ANC apparatus 12 shown in FIG. 5 and the ANC apparatus 12*a* shown in FIG. 8 have the gain adjuster 78. However, the ANC apparatus 12*b* shown in FIG. 9 has a reducer 90 and a selector switch 92 in the adaptive filtering processor 70*b*.

The reducer 90 serves to gradually reduce the filter coefficient Wr. The selector switch 92 switches based on a command from the steered state detector 76. Specifically, if the steering angle θs is not greater than the threshold value TH_θs, then the steered state detector 76 controls the selector switch 92 to connect a filter coefficient updater 84*b* and the adaptive filter 80*b* to each other, making it possible to update the filter coefficient Wr according to an adaptive control process. If the steering angle θs is greater than the threshold value TH_θs, then the steered state detector 76 controls the selector switch 92 to connect the reducer 90 and the adaptive filter 80*b* to each other, making it possible to gradually reduce the filter coefficient Wr regardless of the adaptive control process. When the selector switch 92 is controlled to connect the reducer 90 and the adaptive filter 80*b* to each other, the filter coefficient updater 84*b* may indicate the last filter coefficient Wr to the reducer 90, which may gradually reduce the filter coefficient Wr from an initial value that is represented by the indicated filter coefficient Wr.

3. Timing to Start Suppressing Rear Road Wheel Canceling Sound CSr and Period During which Rear Road Wheel Canceling Sound CSr is Suppressed:

In the above embodiment, while the steering angle θs is greater than the threshold value TH_θs, the gain G1 is changed from the value Gnormal to the value Gsmall to suppress the rear road wheel canceling sound CSr (FIG. 7). However, the rear road wheel canceling sound CSr may start being suppressed at other timings and may be suppressed during other periods.

Figure 10:
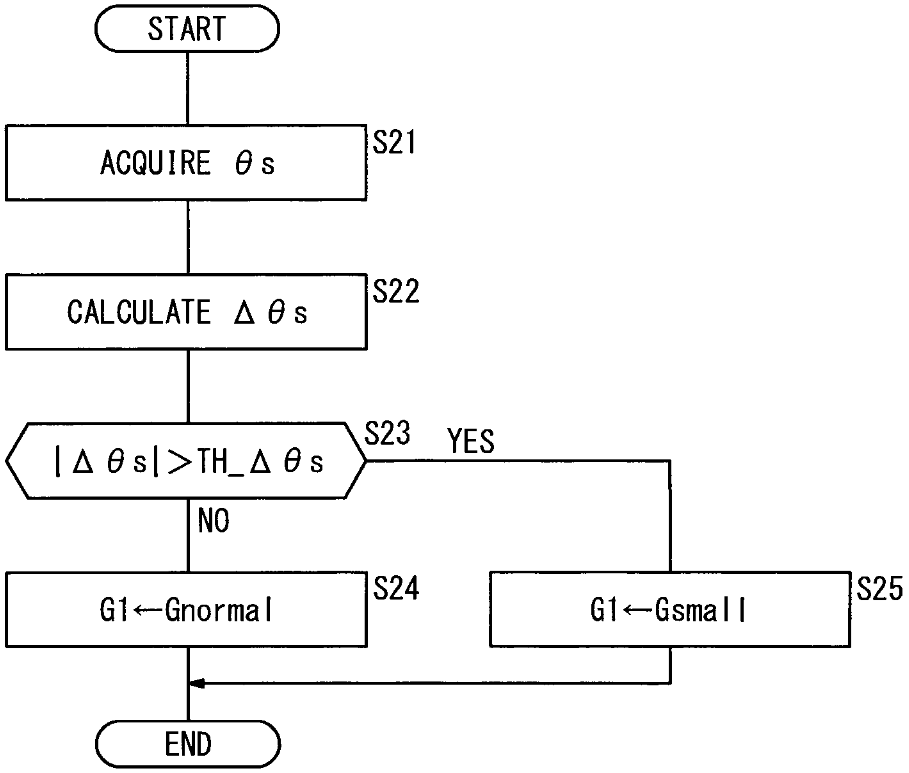
FIG. 10 is a flowchart of a first modification of the flowchart shown in FIG. 7.

FIG. 10 is a flowchart of a first modification of the processing sequence (FIG. 7) of the steered state detector 76.

In step S21, the steered state detector 76 acquires a steering angle θs from the steering angle sensor 20. In step S22, the steered state detector 76 calculates a change per unit time in the steering angle θs (hereinafter referred to as "steering rate Δθs") [degrees/s].

In step S23, the steered state detector 76 judges whether the absolute value of the steering rate Δθs is greater than a steering rate threshold value TH_Δθs (hereinafter referred to as "threshold value TH_Δθs") or not. The threshold value TH_Δθs is a positive value for judging whether the path followed by the front road wheels 28*a* of the vehicle 10 and the path followed by the rear road wheels 28*b* thereof are different from each other or not.

If the absolute value of the steering rate Δθs is not greater than the threshold value TH_Δθs (S23: NO), then the steered state detector 76 sets a gain value Gnormal, which is used normally, as the gain G1 in step S24.

If the absolute value of the steering rate Δθs is greater than the threshold value TH_Δθs (S23: YES), then the steered state detector 76 sets a gain value Gsmall, which is smaller than the gain value Gnormal, as the gain G1 in step S25.

According to the processing sequence shown in FIG. 10, by comparing the steering rate Δθs and the threshold value TH_Δθs (second threshold value) with each other, it is possible to detect relatively easily that the paths followed by the front road wheels and the rear road wheels are different from each other.

Figure 11:
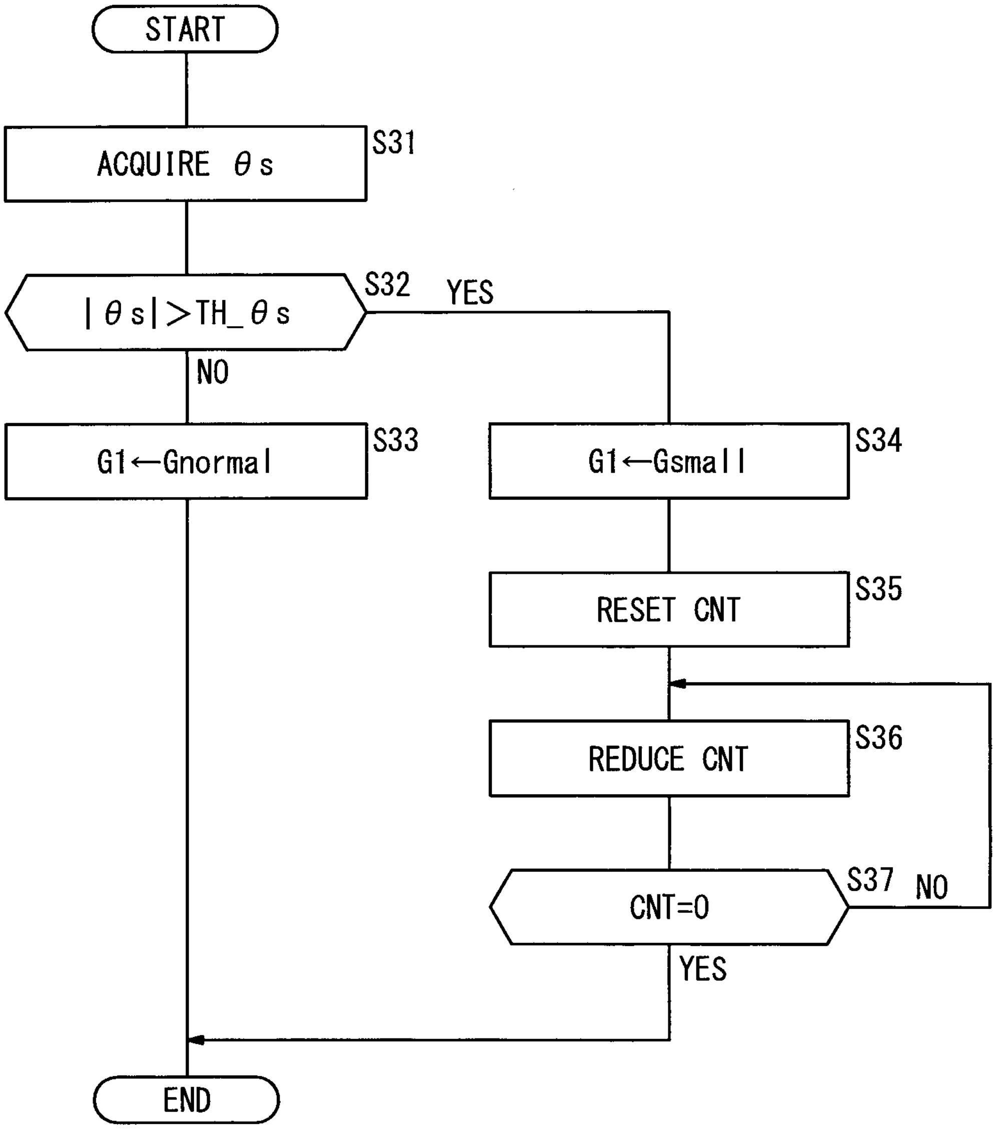
FIG. 11 is a flowchart of a second modification of the flowchart shown in FIG. 7.
Figure 12:
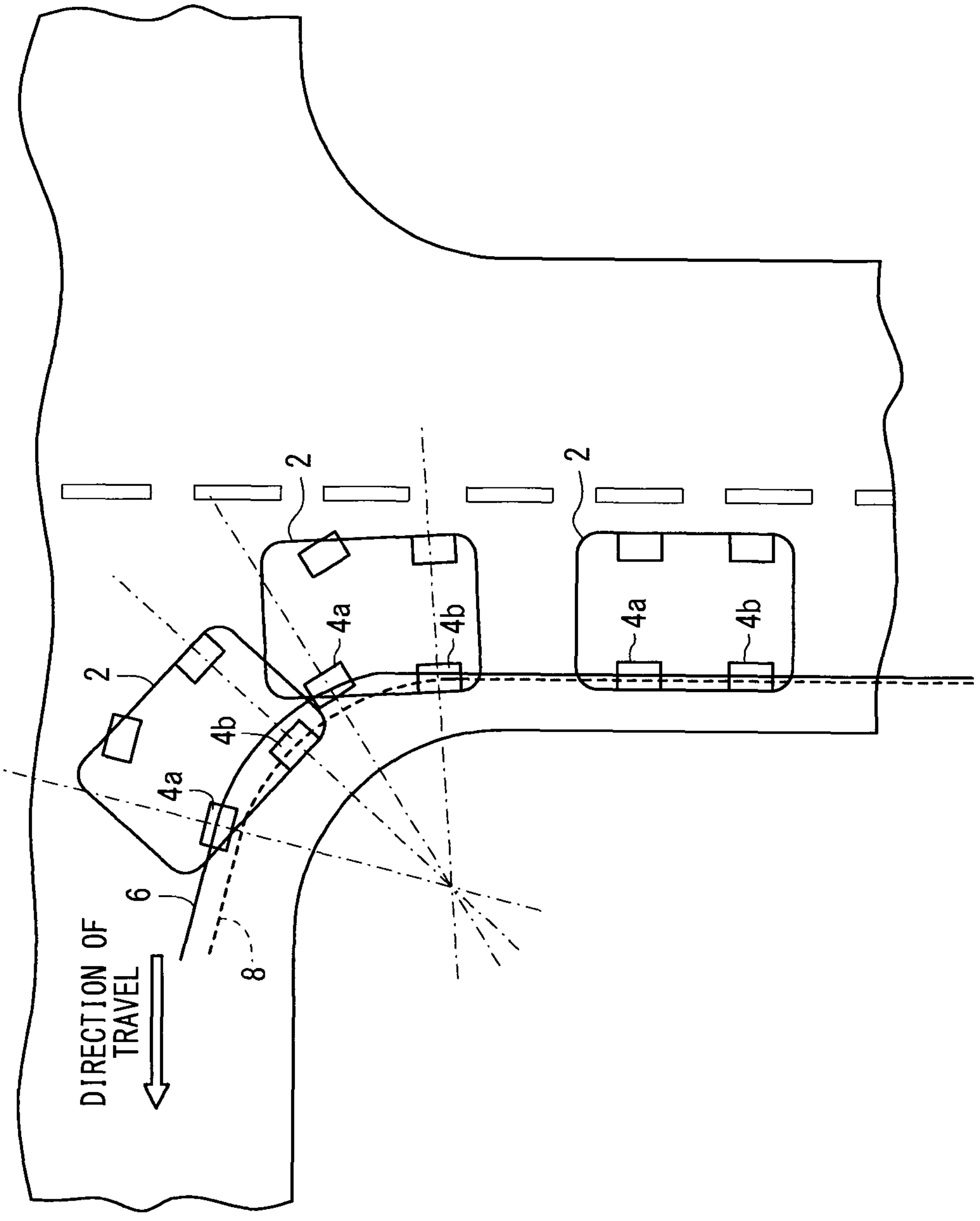
FIG. 12 is a view illustrative of the difference between inner road wheel paths and the difference between outer road wheel paths.

FIG. 11 is a flowchart of a second modification of the processing sequence (FIG. 7) of the steered state detector 76.

Steps S31 through S34 are identical to steps S11 through S14 shown in FIG. 7. In step S35, the steered state detector 76 resets the count value CNT of a count-down counter, not shown, to a maximum value. In step S36, the steered state detector 76 starts to reduce the count value CNT. In step S37, the steered state detector 76 judges whether the count value CNT is zero or not. If the count value CNT is not zero (S37: NO), then control goes back to step S36. If the count value CNT is zero (S38: YES), then the present cycle of the processing sequence is ended.

If it is detected that the path followed by the front road wheels 28*a* and the path followed by the rear road wheels 28*b* are different from each other based on the steered state, then it is considered that a certain time needs to elapse until the paths become aligned with each other. According to the processing sequence shown in FIG. 11, a minimum time required for the path followed by the front road wheels 28*a* and the path followed by the rear road wheels 28*b* to be brought into alignment with each other may be set as a predetermined time to prevent the paths from being judged in error as being brought into alignment with each other regardless of the fact that the paths remain different from each other.

4. Others:

In the above embodiment, the delay quantity calculator 74 and the steered state detector 76 are provided in each of the control signal generators 62. However, the ANC apparatus 12 may have a single delay quantity calculator 74 and a single steered state detector 76, and the single delay quantity calculator 74 may set a delay quantity n in each of the control signal generators 62 whereas the single steered state detector 76 may set a gain G1 in each of the control signal generators 62.

In the above embodiment, the gain G1 may be set to two gain values. However, the gain G1 may be set to three or more gain values. The relationship between the steering angle θs and the gain G1 may be stored as mapped data in the memory 58, and the mapped data may be used.

The invention claimed is:

1. An active vibration noise control apparatus comprising:

a front road wheel vibration detecting unit for detecting a front road wheel vibration based on a road input to a front road wheel of a vehicle and outputting a front road wheel reference signal representing the detected front road wheel vibration;

a vehicle speed detecting unit for detecting a vehicle speed of the vehicle;

a delay time calculating unit for determining a delay time which represents a difference between times at which the front road wheel of the vehicle and a rear road wheel thereof pass through one spot;

a rear road wheel reference signal output unit for outputting a rear road wheel reference signal representing a predicted rear road wheel vibration which is a delayed front road wheel vibration for the delay time;

a canceling sound output unit for outputting, based on the front road wheel reference signal, a front road wheel canceling sound for canceling a front road wheel vibration noise due to the front road wheel vibration at a sound silencing target position, and for outputting, based on the rear road wheel reference signal, a rear road wheel canceling sound for canceling a rear road wheel vibration noise due to the predicted rear road wheel vibration at the sound silencing target position; and a steered state detecting unit for detecting a steered state of the vehicle;

wherein the canceling sound output unit suppresses only output of the rear road wheel canceling sound without suppressing output of the front road wheel canceling sound when the canceling sound output unit detects that a path followed by the front road wheel and a path followed by the rear road wheel are different from each other based on the steered state.

2. The active vibration noise control apparatus according to claim 1, wherein the canceling sound output unit detects that the path followed by the front road wheel and the path followed by the rear road wheel are different from each other if a steering quantity representing the steered state is greater than a first threshold value.

3. The active vibration noise control apparatus according to claim 1, wherein the canceling sound output unit detects that the path followed by the front road wheel and the path followed by the rear road wheel are different from each other if a steering rate representing the steered state is greater than a second threshold value.

4. The active vibration noise control apparatus according to claim 1, wherein the canceling sound output unit suppresses output of the rear road wheel canceling sound for a predetermined period after having detected that the path followed by the front road wheel and the path followed by the rear road wheel are different from each other based on the steered state.

* * * * *